US007110939B2

(12) United States Patent
Ozawa et al.

(10) Patent No.: US 7,110,939 B2
(45) Date of Patent: Sep. 19, 2006

(54) PROCESS OF AUTOMATICALLY GENERATING TRANSLATION-EXAMPLE DICTIONARY, PROGRAM PRODUCT, COMPUTER-READABLE RECORDING MEDIUM AND APPARATUS FOR PERFORMING THEREOF

(75) Inventors: Hitoshi Ozawa, Ota (JP); Kyoko Kawazu, Ota (JP)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 09/942,915

(22) Filed: Aug. 31, 2001

(65) Prior Publication Data

US 2002/0143537 A1 Oct. 3, 2002

(30) Foreign Application Priority Data

Mar. 30, 2001 (JP) ............................ 2001-102266

(51) Int. Cl.
*G06F 17/28* (2006.01)

(52) U.S. Cl. .................................. 704/7; 10/2; 10/277

(58) Field of Classification Search .................... 704/7, 704/2, 10

See application file for complete search history.

(56) References Cited

U.S. PATENT DOCUMENTS

| | | | | |
|---|---|---|---|---|
| 4,654,798 | A * | 3/1987 | Taki et al. | 704/7 |
| 5,311,429 | A * | 5/1994 | Tominaga | 704/10 |
| 5,579,224 | A * | 11/1996 | Hirakawa et al. | 704/2 |
| 5,644,774 | A * | 7/1997 | Fukumochi et al. | 704/4 |
| 5,659,765 | A * | 8/1997 | Nii | 704/4 |
| 5,867,811 | A * | 2/1999 | O'Donoghue | 704/1 |
| 6,804,637 | B1 * | 10/2004 | Tokuda et al. | 704/2 |

* cited by examiner

*Primary Examiner*—Richemond Dorvil
*Assistant Examiner*—Qi Han
(74) *Attorney, Agent, or Firm*—Staas & Halsey LLP

(57) ABSTRACT

A process of creating a translation-example dictionary for an Example-based Machine Translation is provided. The process of the invention includes the steps of: a) comparing first translation-example information and another first translation-example information to detect if there is any differing portion; specifying a word class of each of differing portions, if any, detected in the step a); c) generating variables by linking the at least one differing portion detected in the step a) and the word class specified in the step b) so as to create second translation-example information; and d) registering the second translation-example information into the translation-example dictionary.

6 Claims, 11 Drawing Sheets

| ORIGINAL TEXT | TRANSLATED TEXT |
|---|---|
| 上期は黒字。 | They are black figures the first half. |
| 下期は黒字。 | They are black figures the second half. |
| 業績は黒字だった。 | Achievements were black figures. |
| 業績は赤字だった。 | Achievements were red figures. |
| 予算の達成は難しい。 | Achievement of budget is difficult. |
| 予算の達成はやさしい。 | Achievement of budget is easy. |
| 上期の業績は黒字に転じた。 | The achievements of the first half were changed into black figures. |
| 下期の業績は黒字に転じた。 | The achievements of the second half were changed into black figures. |

| ORIGINAL TEXT | TRANSLATED TEXT | NUMBER OF PORTIONS EXPRESSED AS VARIABLES |
|---|---|---|
| <n1>は黒字。 | They are black figures the <n1> half. | 1 |
| <n1>は<n2>だった。 | <n1> were <n2>. | 2 |
| <n1>は<adv1>。 | <n1> is <adv1>. | 2 |
| <n1>の<n2>は<n3>に転じた。 | The <n2> of the <n1> were changed into the <n3>. | 3 |

710

| | ORIGINAL TEXT | TRANSLATED TEXT | NUMBER OF VARIABLES |
|---|---|---|---|
| 711 | <n1>です。 | It is <n1>. | 1 |
| 712 | <n1>は<adv1>。 | There are <adv1> <n1>. | 2 |
| 713 | <n1>の<n2>は<n3>だった。 | The <n2> of the <n1> were <n3>. | 3 |

PROCESS OF AUTOMATICALLY GENERATING TRANSLATION-EXAMPLE DICTIONARY, PROGRAM PRODUCT, COMPUTER-READABLE RECORDING MEDIUM AND APPARATUS FOR PERFORMING THEREOF

BACKGROUND OF THE INVENTION

1. Field of the Invention

The present invention relates to a machine-translating process and particularly relates to a process of automatically generating a translation-example dictionary in which some portions of translation-example information are expressed by variables.

2. Description of the Related Art

When translating an original text written in a source language into another language using a machine translation system, it is often insufficient to use a basic dictionary and/or a technical term dictionary provided in a computer for providing a translation which corresponds well to the meaning of the original text. Accordingly, an Example-based Machine Translation process has been proposed in which frequently-used translation examples each including an original text and a translated text are pre-registered by a person in charge of translation and then a translation process of the relevant original text is performed.

A translation-example dictionary used in the Example-based Machine Translation may be a type of dictionary in which some portions of the translation example information, for example nouns, are expressed as variables. Such a dictionary is used for a machine translation process in which, when there is a correspondence between the original text to be translated and the original text data in the translation-example dictionary where from the variable have been excluded, the variables of the original text data and the translated text data are substituted by data included in the basic dictionary and/or technical term dictionary.

In order to create a translation-example dictionary having some portions of the translation-example information expressed as variables, the person in charge of translation must determine which portion of the original text and the translated text are to be expressed as variables. Also, since the variables must be manually registered into the dictionary by the person in charge of translation, many steps are required for creating the translation-example dictionary, and also, there is a problem that the judging criteria for portions to be expressed as variables may differ between different persons in charge of translation.

Also, it is understood that the reliability of a translated text obtained by translation using a translation-example dictionary having many variables is lower than the reliability of a translated text obtained by translation using a translation-example dictionary having a few variables. Often, however, no material is provided for determining the reliability of the translated text.

SUMMARY OF THE INVENTION

Accordingly, it is a general object of the present invention to provide a process for automatically generating a translation-example dictionary which can solve the problems described above.

It is another and more specific object of the present invention to provide a process for automatically generating a translation-example dictionary in which some portions of the translation-example information are expressed as variables, and to record a number of portions expressed as variables in the translation-example information.

In order to achieve the above object, a process of a process of creating a translation-example dictionary for an Example-based Machine Translation is provided, the process including the steps of:

a) comparing first translation-example information and another first translation-example information to detect if there is any different portion;

b) specifying a word class of each of different portions, if any, detected in the step a);

c) generating variables by linking the at least one different portion detected in the step a) and the word class specified in the step b) so as to create second translation-example information; and d) registering the second translation-example information into the translation-example dictionary.

The process of the present invention is particularly useful for automatically generating a translation-example dictionary in which some portions of the translation-example information are expressed as variables. For example, the translation-example dictionary in which a part of the translation-example information are expressed as variables can be automatically generated from an existing translation-example dictionary without needing many steps and in such a manner that judgment criteria for portions to be expressed as variables do not differ between different persons in charge of translation.

Also, as in a case where it is required to distinguish between a translated text with a comparatively high reliability which has been translated using a translation-example information with less portions expressed as variables and a translated text with a comparatively low reliability which has been translated using a translation-example information with more portions expressed as variables, and display them separately, a number of portions expressed as variables in the translation-example information may also be recorded.

BRIEF DESCRIPTION OF THE DRAWINGS

FIG. 4 is a diagram showing a first translation-example dictionary.

FIG. 5 is a diagram showing a second translation-example dictionary.

FIG. 7 is a flow chart showing various steps for determining whether the read out original texts are similar.

DETAILED DESCRIPTION OF THE PREFERRED EMBODIMENTS

In the following, principles and embodiments of the present invention will be described with reference to the accompanying drawings.

Figure 1:
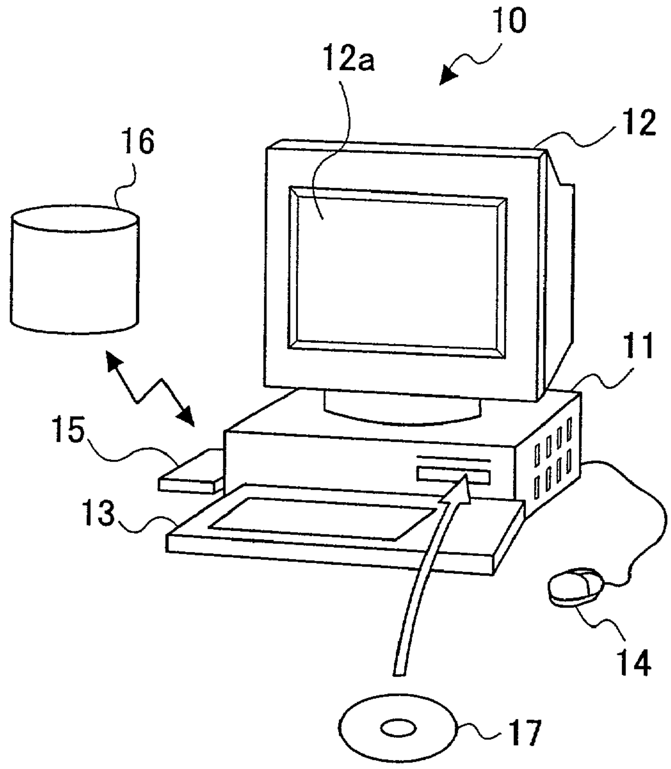
FIG. 1 is a schematic diagram showing an information processing apparatus which may implement a process of the present invention.

FIG. 1 is a schematic diagram showing an information processing apparatus which may implement a process of the present invention. A computer system shown in FIG. 1 is formed by a general computer system such as a personal computer (PC). The computer system 10 generally includes a main body part 11 which includes a CPU, a disk drive and the like, a display unit 12 which displays an image on a display screen 12*a* in response to an instruction to the computer system 10, a keyboard 13 which is used to input various kinds of information to the computer system 10, a mouse 14 which is used to make access to an external data base or the like and to download a program or the like stored in another computer system. A program which is stored in a portable recording medium such as a disk 17 or is downloaded from a recording medium 16 of another computer system by use of a communication unit such as the modem 15, is input to and is compiled in the computer system 10. This program includes a program for causing the CPU of the computer system 10 to carry out a process of creating a translation-example dictionary for using in an Example-based Machine Translation.

Figure 2:
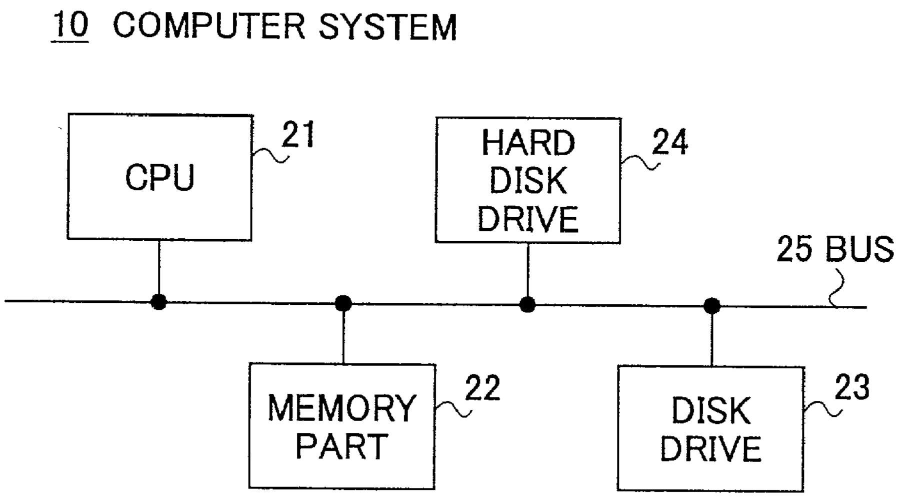
FIG. 2 is a system block diagram showing the construction of an important part within the main body part of the computer system of FIG. 1.

FIG. 2 is a system block diagram showing the construction of an important part within the main body part 11 of the computer system 10 of FIG. 1. In FIG. 2, the main body part 11 generally includes a CPU 21, a memory part 22 including a RAM, ROM or the like, a disk drive 23 for the disk 17, and a hard disk drive 24 which are coupled via a bus 25. The display unit 12 and the like are coupled to the bus 25.

The construction of the computer system 10 is not limited to that shown in FIGS. 1 and 2 and various known constructions may be used in place thereof.

Figure 3:
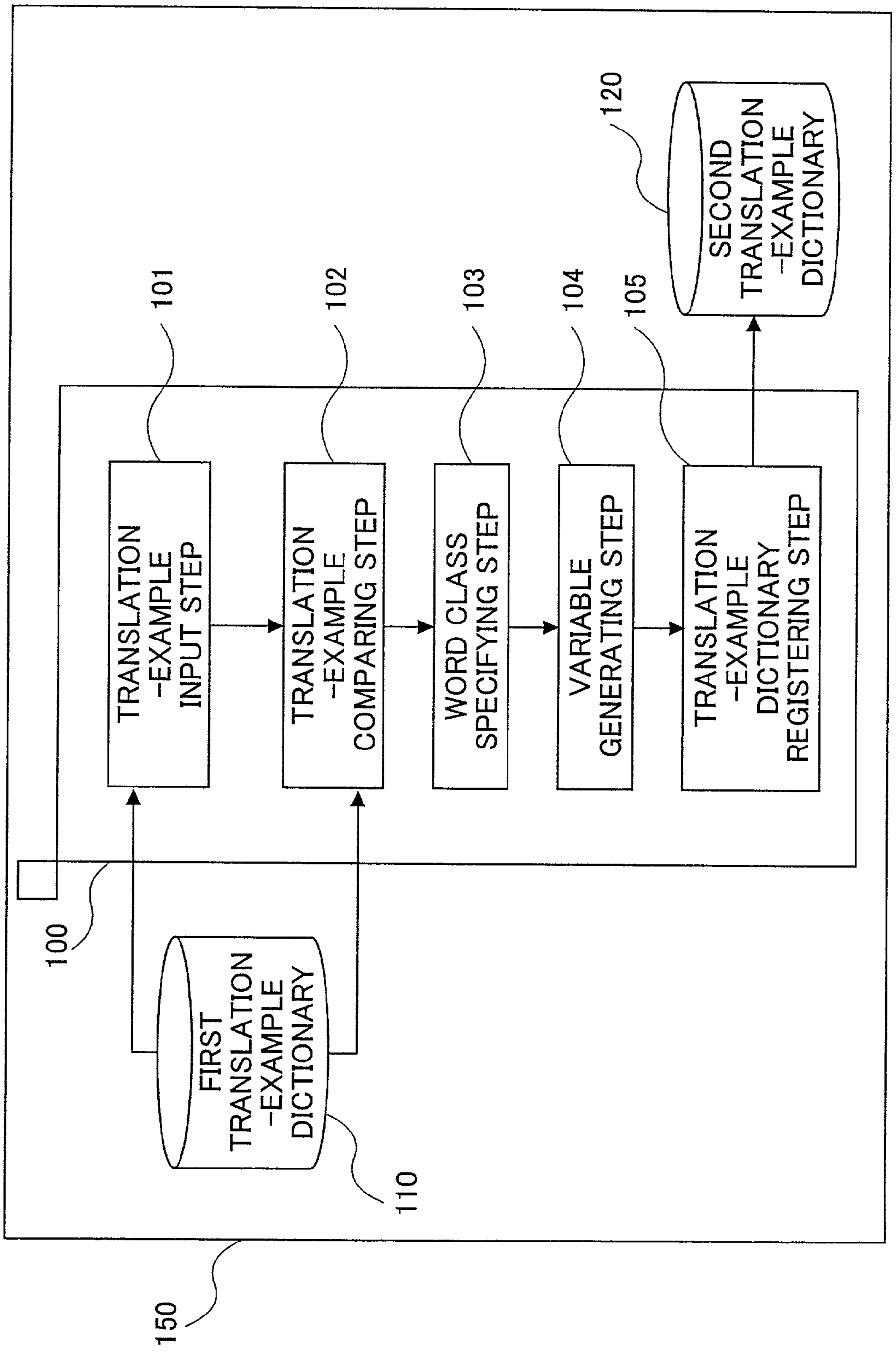
FIG. 3 is a schematic diagram showing a principle structure of the present invention.
Figure 6:
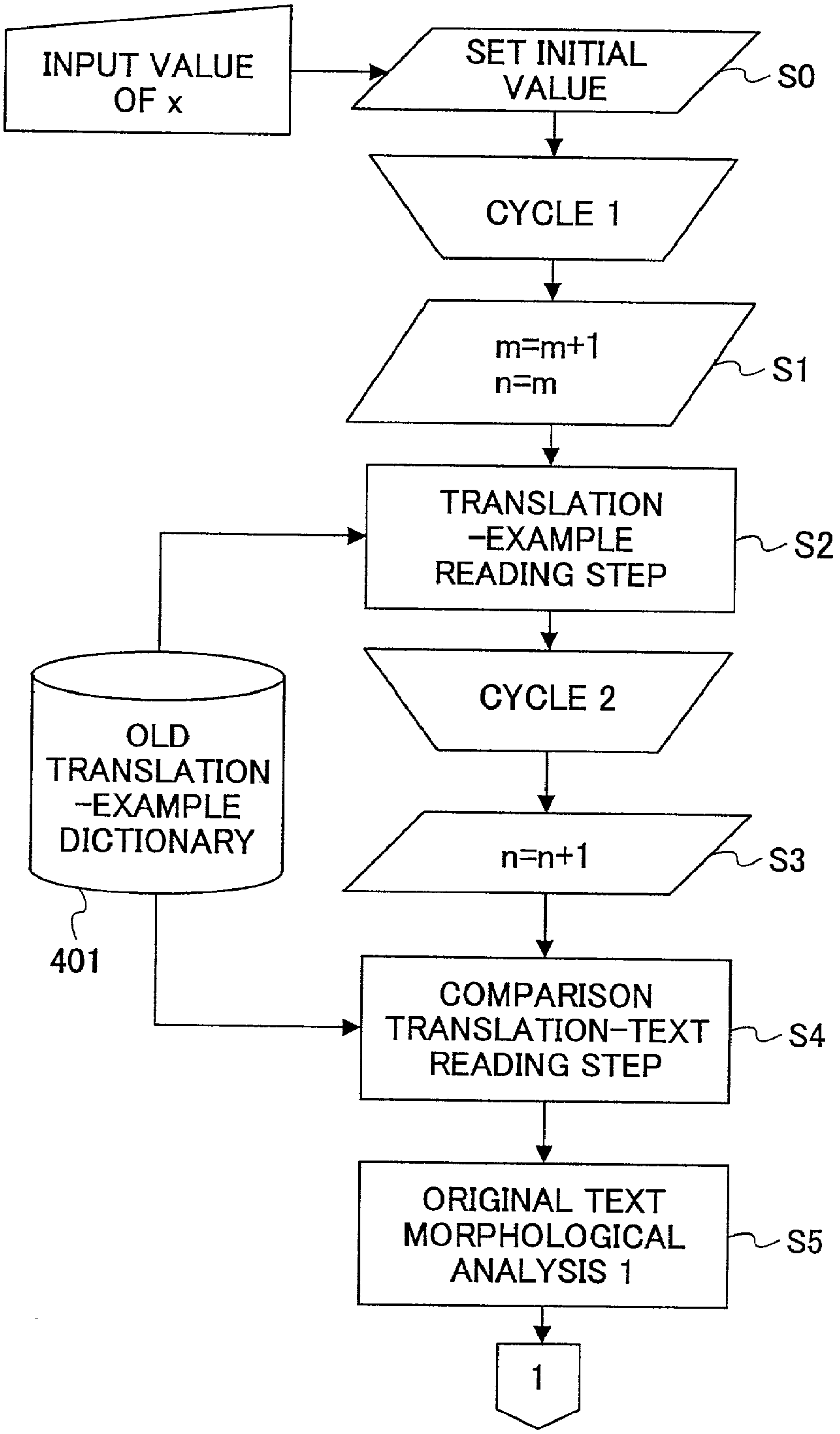
FIG. 6 is a flow chart showing various steps for reading out first translation-examples and a step of morphological analysis of the original text.
Figure 7:
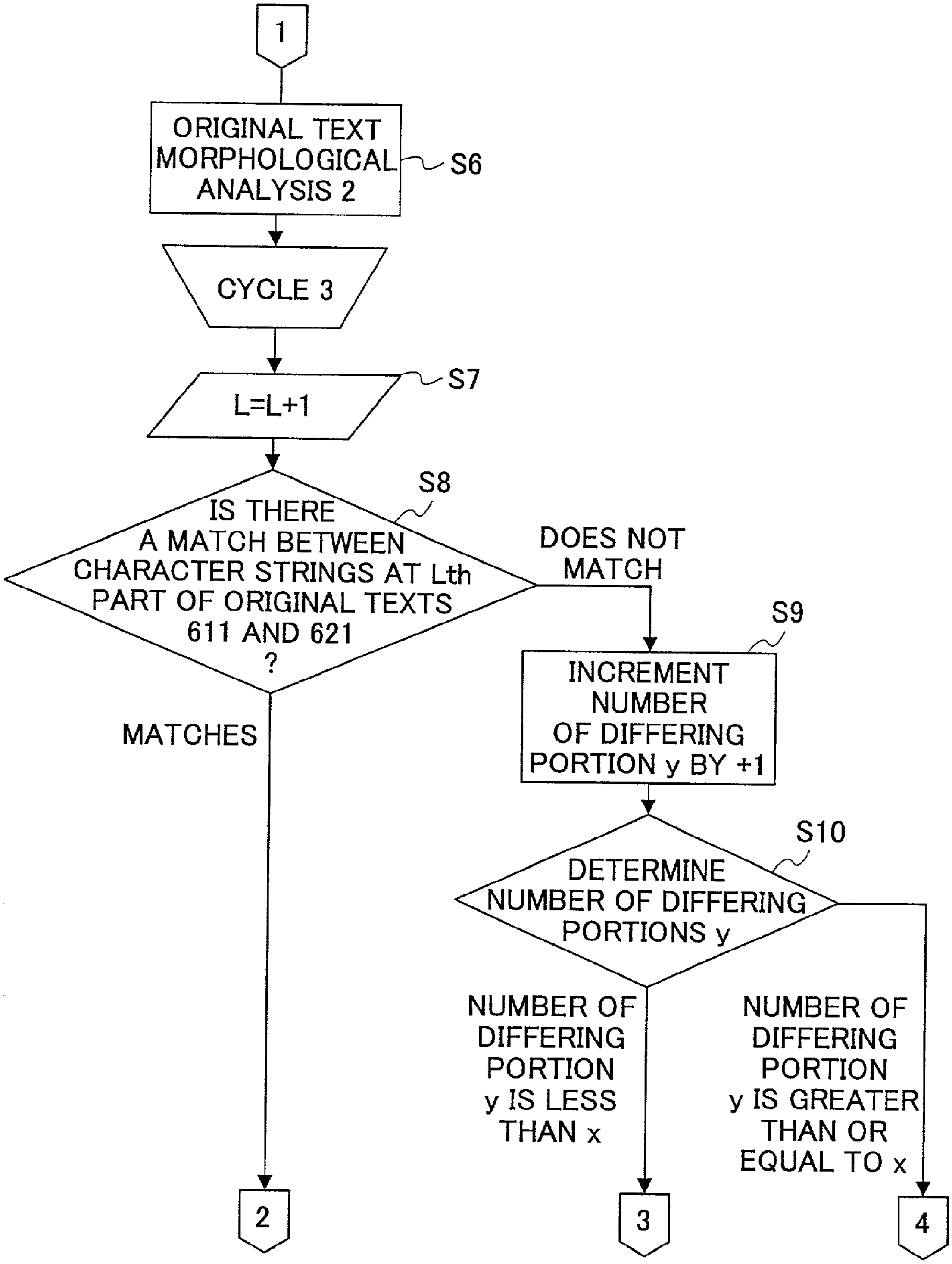

Referring now to FIGS. 3 to 5, an embodiment of the present invention will be described.

FIG. 3 is a schematic diagram showing a principle structure of the present invention. An automatic translation-example dictionary generating program 100 includes a translation-example input step 101, a translation-example comparing step 102, a word class specifying step 103, a variable generating step 104 and a translation-example dictionary registering step 105.

An automatic translation-example dictionary generating apparatus 150 includes a first translation-example dictionary 110, the automatic translation-example dictionary generating program 100 which may operate in the apparatus 150, and a second translation-example dictionary 120.

As shown in FIG. 4, the first translation-example dictionary 110 includes first translation-example information 200 each having an original text data 201 and a translated text data 202 and not having any variable portions.

As shown in FIG. 5, the second translation-example dictionary 120 includes second translation-example information 300 each having an original text data 301 and a translated text data 302 and having at least one variable portion. The second translation-example information 300 may include information related to a number of variable portions expressed as variables 303 in the original and translated text information.

In translation-example input step 101, the first translation-example information 200 including the original text data 201 and the translated text data 202 shown in FIG. 4 is read out from the first translation-example dictionary 110.

In translation-example comparing step 102, a comparison is made to detect differing portions between the original text data 201 of the first translation-example information 200 read out in the translation-example input step 101 and an original text data of other translation-example in the first translation-example dictionary 110.

In the word class-specifying step 103, a word class of the differing portion detected in the translation-example comparing step 102 is specified.

In the variable generating step 104, the differing portion detected in the translation-example comparing step 102 and the type of the word class specified in the word class-specifying step 103 are linked so as to create the second translation-example information 300 having the original text data 301 and the translation information 302 having variable portions. Note that the variable generating step 104 may create data of the number of variable portions expressed as variables 303 as a part of the second translation-example information as well as the original text data 301 and the translated text data 302.

In the translation-example registering step 105, the second translation-example information 300 shown in FIG. 5 which have been created in the variable generating step 104 is registered in the second translation dictionary 120.

An embodiment of the present embodiment will be described with reference to FIGS. 6 to 12.

The present embodiment will be described based on an example where reference translation-example information 610 and comparison translation-example information 620 are read out from the old translation-example dictionary 401. If the reference translation-example information 610 and comparison translation-example information 620 are similar, the second translation-example information 630 including the differing portions expressed as variables are registered into a new translation-example dictionary 403.

The reference translation-example information and the comparison translation-example information are read out from the first translation-example dictionary according to steps S0 to S4 below.

A value received from the user is set as an initial value of value x to be used as a threshold value for determining whether the translation-example information are similar to each other. Variables m and n for indicating reading position of the first translation-example dictionary, y for determining the number of differing portions, and variable L used for determining the differing portion are initialized to a value 0. (Step S0).

Position m of the reference translation-example information to be read from the old translation-example dictionary 401 and position n to be compared are determined (Step S1).

Reference translation-example information 610 is read out at an mth position from the old translation-example dictionary 401. (Step S2).

A read out position of the comparison translation-example information to be compared with the reference translation-example information 610 is set to an n+1th position. (Step S3).

The comparison translation-example information 620 is read out at an nth position from the old translation-example dictionary 401. (Step S4).

The original text data of both the reference translation-example information 610 and the comparison translation information 620 are divided into a plurality of parts corresponding to units of word class and then compared so as to determine whether the translation-example information are similar to each other according to steps S5 to S10 below.

A morphological analysis of the original text 611 of the translation-example information 610 read out in step S2 is implemented and it is divided into a plurality of parts in accordance with word class units. (Step S5).

A morphological analysis of the original text 621 of the translation-example information 620 read out in step S4 is implemented and it is into a plurality of parts in accordance with word class units. (Step S6).

The comparison position of the part units divided in steps S5 and S6 is set to L+1th position. (Step S7).

A comparison is made to determine whether respective character strings of Lth parts divided in steps S5 and S6 match. Note that determination of a match may be performed using semantic correspondence. (Step S8).

If the comparison result of step S8 does not indicate a match, the number of differing position y is incremented by +1. (Step S9).

The number of differing position y is determined. If the differing position is greater than or equal to x, it is determined that the comparison translation-example information 620 is not similar to the reference translation-example information 610, and after setting the number of differing position y and the comparison position of part unit L is set to 0, proceed to the comparison translation-example reading process (S4) to read a new translation-example information 620 to be compared. (Step S10).

Figure 8:
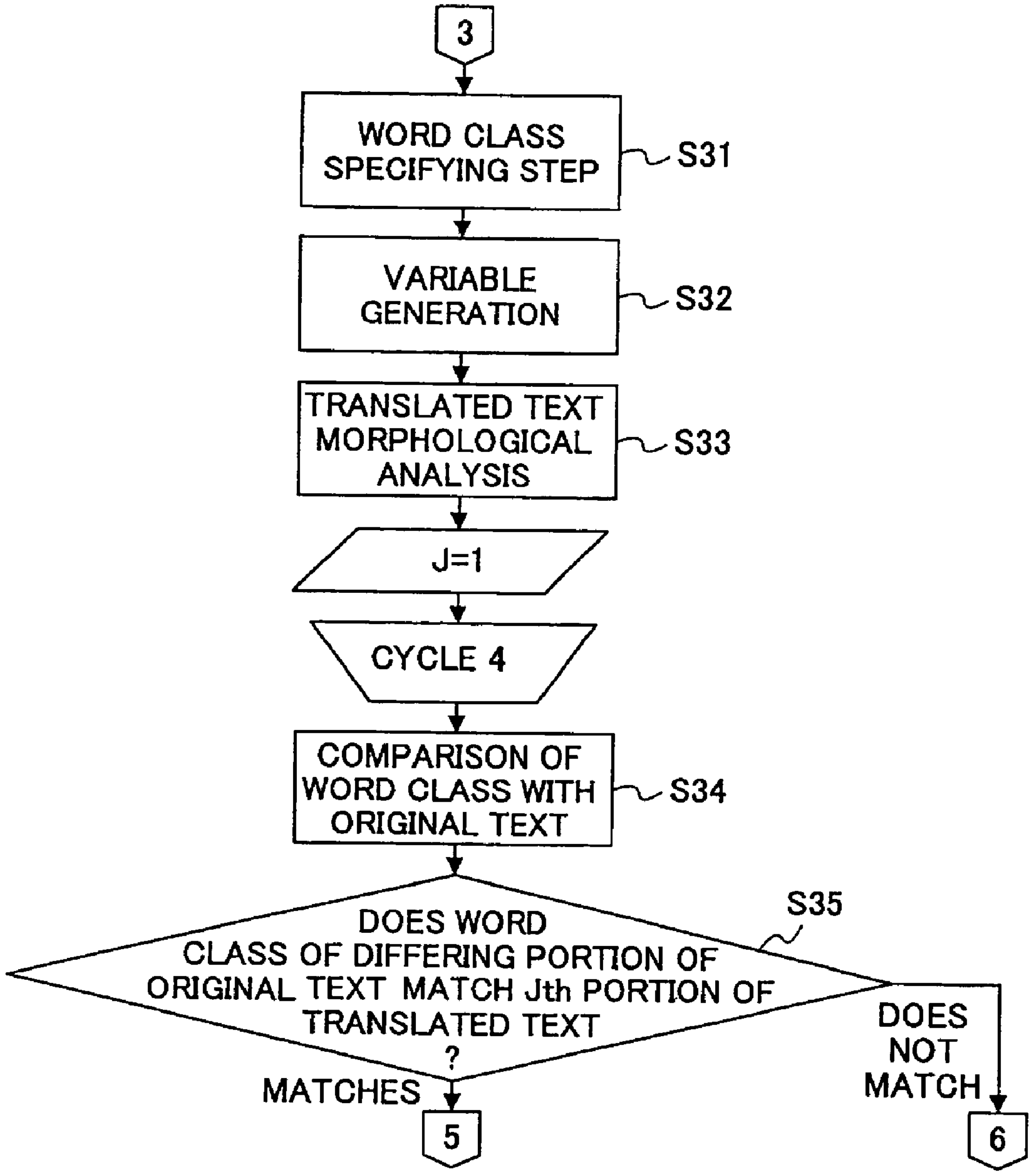
FIG. 8 is a flow chart showing various steps for expressing the differing parts in the original text as variables and a step of morphological analysis of the translated text.

A process for expressing the differing portions of the original text data as variables is carried out in steps S31 and S32 shown in FIG. 8 and described below.

If the differing position y is less than x, a word class of the differing portion is specified. (Step S31).

A differing portion between the original text data 611 of the reference translation-example information 610 and the original text 621 of the comparison translation-example information 620 is linked to the word class specified in step S31 and expressed as a variable. (Step S32).

Figure 9:
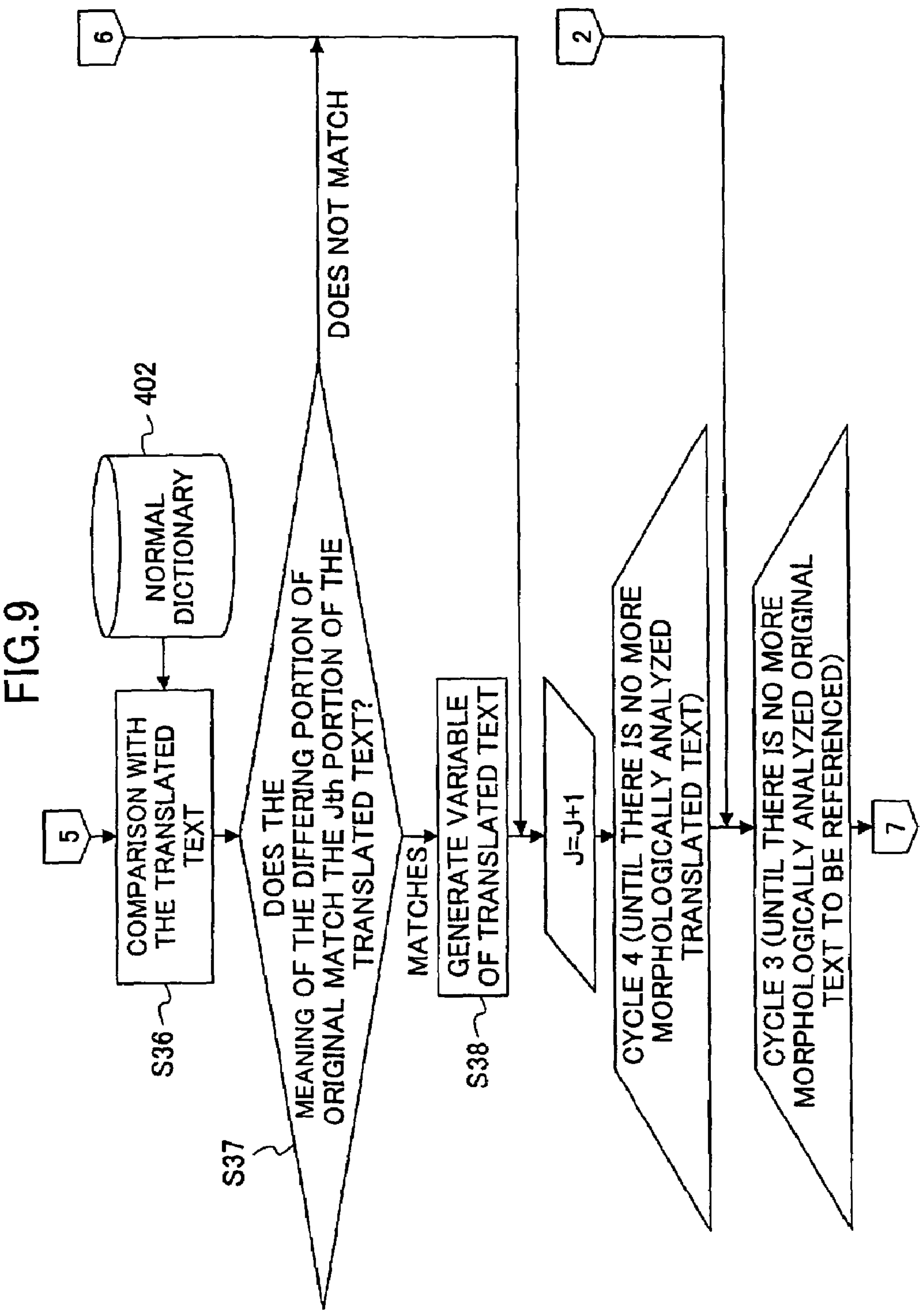
FIG. 9 is a flow chart showing various steps for expressing the differing parts in the translated text as variables.

A process for expressing the differing portions of the translated text data as variables is carried out in steps S33 to S38 shown in FIGS. 8 and 9 and described below.

A morphological analysis of the translated text data 622 of the comparison translation-example information 620 is implemented and it is divided into a plurality of parts corresponding to word class units. (Step S33).

A comparison is made between types of the word class specified in step S31 and the word class of the Jth part divided in step S33. (Step S34).

If there is no match between the types of word class, increment J such that J=J+1, and implement comparison for the next portion. (Step S35).

If the type of word class matches, translate the Jth part of the parts divided in step S33 to the language of the original text data using commonly used dictionaries 402 such as the basic dictionary or the technical term dictionary. (Step S36).

If there is no matching translation for the differing portion of the original text data and the translation obtained in step S37, increment J such that J=J+1, and implement comparison for the next portion.

If there is a matching translation in step S36, link the Jth part of the translated text data 621 of the comparison translation-example information 620 and the word class of the Jth portion, and express it in as a variable. (Step S38).

Figure 10:
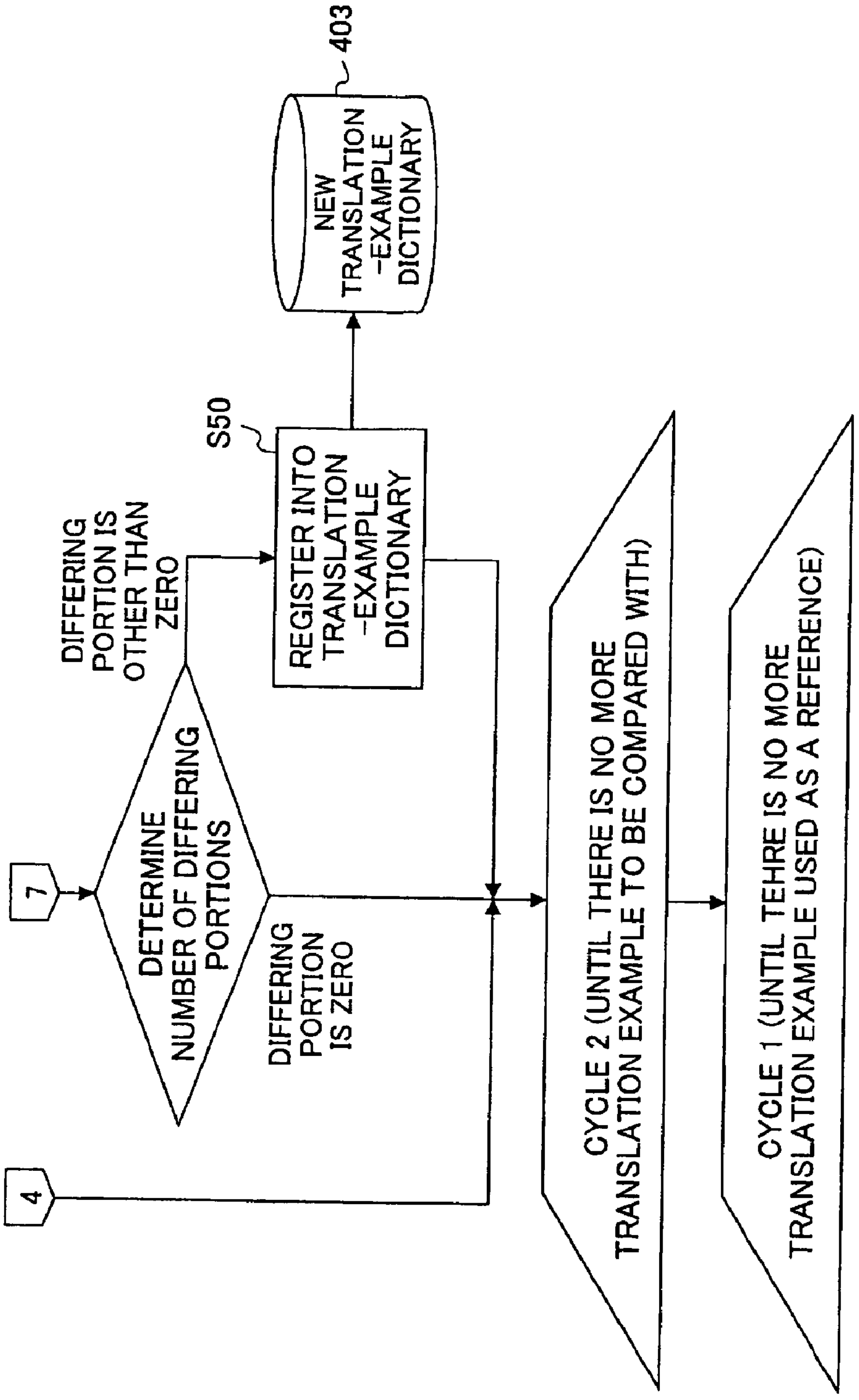
FIG. 10 is a flow chart showing various steps for registering second translation-example information into the second translation-example dictionary.
Figure 11:
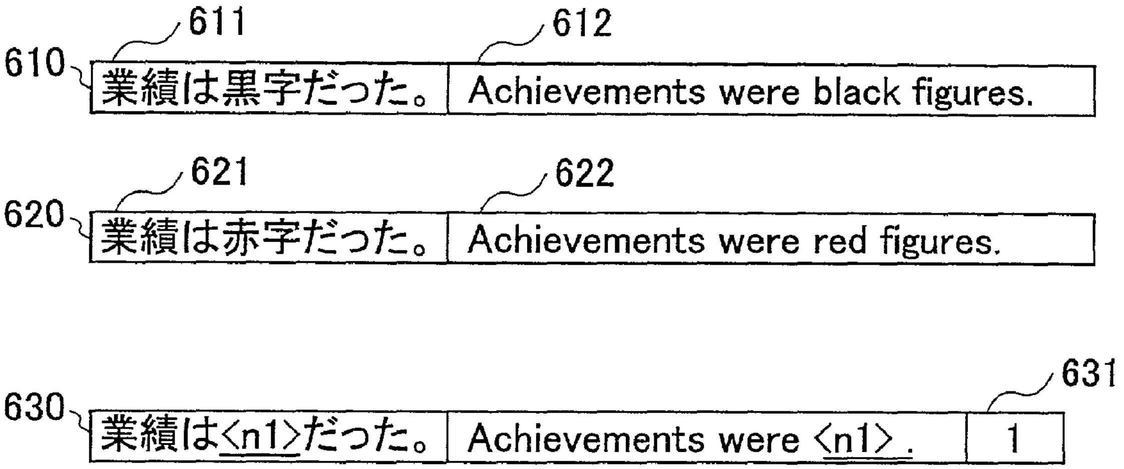
FIG. 11 is a diagram showing a manner in which variables are generated.
Figure 12:
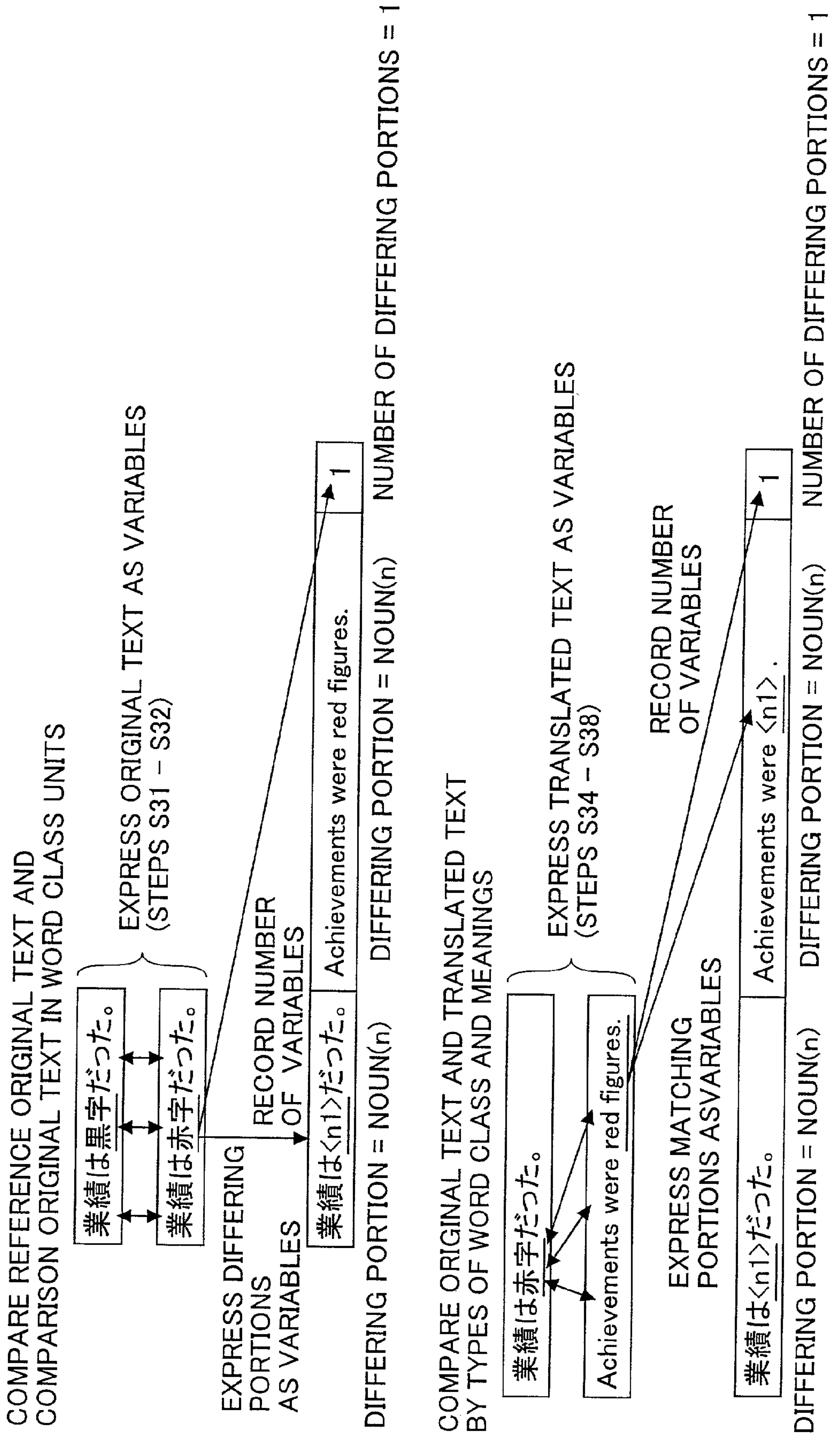
FIG. 12 is a schematic diagram showing a process of creating the second translation-example information.

A process for registering the second translation-example information 630 in which a part of the translation-example information is expressed as variables into the second translation-example dictionary is carried out in step S50 shown in FIG. 10 and described below.

The translation-example information 630 created in steps S32 and S38 are registered in the new translation-example dictionary 403 together with the number of portions expressed as variables 631. Note that when the number of differing portion is zero, it is not necessary to implement registration into the new translation-example dictionary 403. The variable L used for a process of determining the differing portion is initialized to a value 0 (Step S50).

It is to be noted that the above embodiment has been described for a case provided with a single old translation-example dictionary 401 and a single new translation-example dictionary 403, but a plurality of new translation-example dictionaries 403 may be created from a dictionary 403 may be created from a plurality of old translation-example dictionaries 401, or a plurality of new translation-example dictionaries 403 may be created from a single old translation-example dictionary 401.

Also, the new translation-example dictionary 402 may not necessarily be completely new, but may be added to an existing translation-example dictionary.

Figure 13:
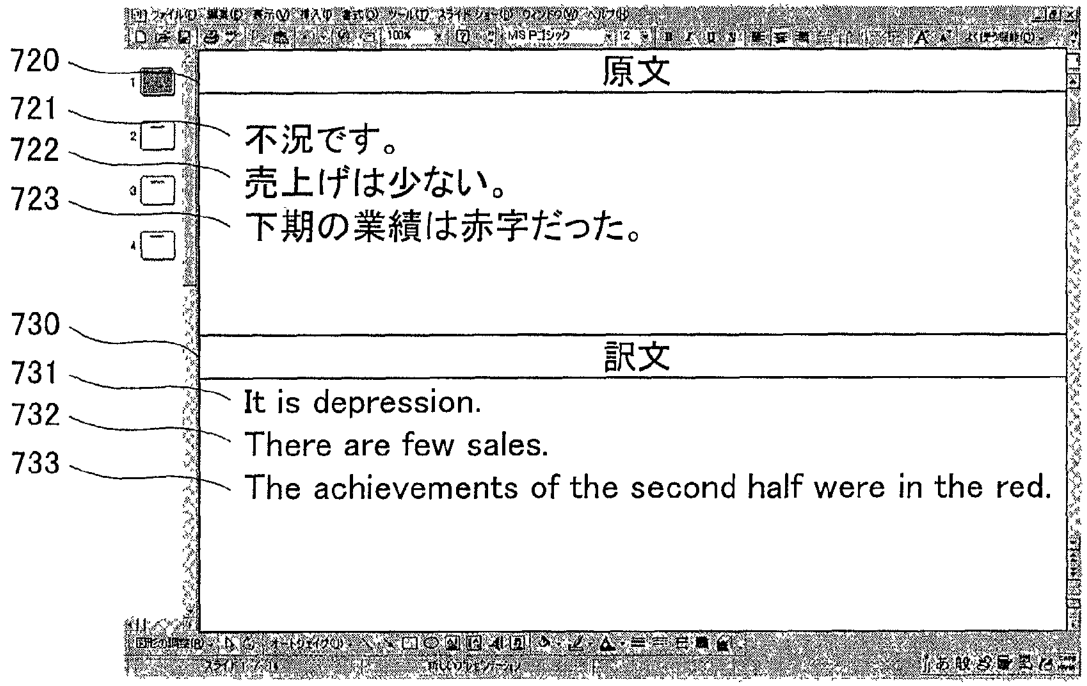
FIG. 13 is a schematic diagram showing a manner in which the translation results are color-coded in accordance with the number of variables.

An embodiment of using the number of portions expressed as variables 631 is described with reference to FIG. 13. A group of original text data 720 are translated using a translation-example dictionary 710 having the number of parts expressed as variables, so as to create a group of translated text data 730.

A first original text data 721 is translated into a first translated text data 731 using a first translation-example information 711 having only one portion that has been expressed as a variable by a translation-example dictionary, and the thus-created first translated text data 731 is displayed in green.

A second original text data 722 is translated into a second translated text data 732 using a second translation-example information 712 having two parts that have been expressed as variables, and the thus-created second translated text data 732 is displayed in yellow.

A third original text data 723 is translated into a third translated text data 733 using a third translation-example information 713 having three parts that have been expressed as variables, and the thus-created third translated text data 733 is displayed in red.

Further, the present invention is not limited to these embodiments, and variations and modifications may be made without departing from the scope of the present invention.

The present application is based on Japanese priority application No. 2001-102266 filed on Mar. 30, 2001, the entire contents of which are hereby incorporated by reference.

What is claimed is:

1. A process of creating a translation-example dictionary for an Example-based Machine Translation, comprising the steps of:

a) comparing first text-based translation-example information and another first text-based translation-example information to detect if there is any differing position;

b) specifying a word class of each of differing positions, if any, detected in said step a);

c) generating variables by linking said at least one differing position detected in said step a) and said word class specified in said step b) so as to create second text-based translation-example information;

d) registering said second text-based translation-example information into said translation-example dictionary; and e) determining that the first text-based translation-example information is not similar to the another first text-based translation example information if a number of the differing positions is greater than a threshold value.

2. The process as claimed in claim 1, wherein said step d) includes a step of recording a number of positions expressed as variables in said translation-example dictionary.

3. A computer program product for creating a translation-example dictionary for an Example-based Machine Translation, said computer program product comprising:

a computer usable medium having computer readable program code means embodied in said medium for causing the computer to creating a translation-example dictionary for an Example-based Machine Translation:

said computer program product having:

computer readable program code means for causing said computer to compare first text-based translation-example information and another first text-based translation-example information to detect if there is any differing position;

computer readable program code means for causing said computer to specify a word class of each of differing positions;

computer readable program code means for causing said computer to generate variables by linking said at least one differing and said word class to create second text-based translation-example information;

computer readable program code means for causing said computer to register said second text-based translation-example information into said translation-example dictionary; and computer readable program code means for determining that the first text-based translation-example information is not similar to the another first text-based translation example information if a number of the differing positions is greater than a threshold value.

4. An apparatus for creating a translation-example dictionary for an Example-based Machine Translation, comprising:

means for comparing first text-based translation-example information and another first text-based translation-example information to detect if there is any differing position;

means for specifying a word class of each of differing positions, if any, detected in said comparing means;

means for generating variables by linking said at least one differing position detected in said comparing means and said word class specified in said specifying means so as to create second text-based translation-example information;

means for registering said second text-based translation-example information into said translation-example dictionary; and means for determining that the first text-based translation-example information is not similar to the another first text-based translation example information if a number of the differing positions is greater than a threshold value.

5. A computer readable recording medium storing program code for causing computer to create a translation-example dictionary for an Example-based Machine Translation, comprising:

first program code means for comparing first text-based translation-example information and another first text-based translation-example information to detect if there is any differing position;

second program code means for specifying a word class of each of differing positions, if any, detected by said first program code means;

third program code means for generating variables by linking said at least one differing position detected by said first program code means and said word class specified in said second program code means so as to create second text-based translation-example information; and fourth program code means for registering said second text-based translation-example information into said translation-example dictionary; and fifth program code means for determining that the first text-based translation-example information is not similar to the another first text-based translation example information if a number of the differing positions is greater than a threshold value.

6. A process of creating a translation-example dictionary for an Example-based Machine Translation, comprising the steps of:

a) comparing first translation-example information and another first translation-example information to detect if there is any differing position;

b) specifying a word class of each of differing positions, if any, detected in said step a);

c) generating variables by linking said at least one differing position detected in said step a) and said word class specified in said step b) so as to create second translation-example information;

d) registering said second translation-example information into said translation-example dictionary; and e) specifying the word class of the differing position if a number of the differing positions is less than a threshold value.

* * * * *

UNITED STATES PATENT AND TRADEMARK OFFICE

CERTIFICATE OF CORRECTION

PATENT NO. : 7,110,939 B2
APPLICATION NO. : 09/943915
DATED : September 19, 2006
INVENTOR(S) : Hitoshi Ozawa et al.

It is certified that error appears in the above-identified patent and that said Letters Patent is hereby corrected as shown below:

Column 7, Line 8, change “translation example” to --translation-example--.

Column 7, Line 40-41, change “translation example” to --translation-example--.

Column 8, Line 6, change “translation example” to --translation-example--.

Column 8, Line 33, change “translation example” to --translation-example--.

Signed and Sealed this

Eighth Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 7,110,939 B2 
APPLICATION NO. : 09/942915
DATED : September 19, 2006
INVENTOR(S) : Hitoshi Ozawa et al.

It is certified that error appears in the above-identified patent and that said Letters Patent is hereby corrected as shown below:

Column 7, Line 8, change “translation example” to --translation-example--.

Column 7, Line 40-41, change “translation example” to --translation-example--.

Column 8, Line 6, change “translation example” to --translation-example--.

Column 8, Line 33, change “translation example” to --translation-example--.

This certificate supersedes Certificate of Correction issued May 8, 2007.

Signed and Sealed this

Twenty-first Day of August, 2007

JON W. DUDAS
*Director of the United States Patent and Trademark Office*